(12) United States Patent
Kolstad et al.

(10) Patent No.: US 7,169,200 B2
(45) Date of Patent: Jan. 30, 2007

(54) PARTICULATE TRAP

(75) Inventors: Owen Charles Kolstad, Peoria, IL (US); Kartik Ganesan Iyer, Novi, MI (US); Kerry Allen Delvecchio, Dunlap, IL (US); Joanna Louise Williams, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 287 days.

(21) Appl. No.: 10/743,810

(22) Filed: Dec. 24, 2003

(65) Prior Publication Data

US 2005/0139074 A1 Jun. 30, 2005

(51) Int. Cl.
*B01D 46/00* (2006.01)

(52) U.S. Cl. .................. 55/282.2; 55/282.3; 55/385.3; 55/484; 55/498; 55/502; 55/510; 55/511; 55/521; 55/525; 55/527; 55/DIG. 10; 55/DIG. 30; 60/311

(58) Field of Classification Search ............... 55/282.2, 55/282.3, 385.3, 484, 495, 497, 498, 500, 55/501, 502, 510, 511, 521, 525, 527, DIG. 10, 55/DIG. 30; 60/311; 95/278, 286
See application file for complete search history.

(56) References Cited

U.S. PATENT DOCUMENTS

| | | | | |
|---|---|---|---|---|
| 3,864,109 A | * | 2/1975 | Hansen | 55/484 |
| 4,894,074 A | * | 1/1990 | Mizrah et al. | 55/484 |
| 5,141,714 A | * | 8/1992 | Obuchi et al. | 55/DIG. 30 |
| 5,145,500 A | * | 9/1992 | Nolen, Jr. | 55/501 |
| 5,290,344 A | * | 3/1994 | Onodera | 55/484 |
| 5,405,422 A | * | 4/1995 | Ueda et al. | 55/282.3 |
| 5,435,915 A | * | 7/1995 | Connors, Jr. | 55/484 |
| 5,571,298 A | * | 11/1996 | Buck | 55/282.3 |
| 6,090,172 A | | 7/2000 | Dementhon et al. | |
| 6,471,918 B1 | * | 10/2002 | Sherwood | 55/DIG. 10 |
| 6,572,682 B2 | * | 6/2003 | Peter et al. | 95/278 |
| 6,846,342 B2 | * | 1/2005 | Mertz et al. | 55/484 |
| 6,916,352 B2 | * | 7/2005 | Sutton et al. | 55/483 |
| 6,942,708 B2 | * | 9/2005 | Peter et al. | 55/282.3 |

FOREIGN PATENT DOCUMENTS

| | | |
|---|---|---|
| WO | WO 01/14696 A1 | 3/2001 |
| WO | WO 02/063145 A2 * | 8/2002 |
| WO | WO 02/083268 A1 | 10/2002 |
| WO | WO 03/002854 A1 | 1/2003 |

* cited by examiner

*Primary Examiner*—Jason M. Greene
(74) *Attorney, Agent, or Firm*—Finnegan, Henderson, Farabow, Garrett & Dunner (57) ABSTRACT

A particulate trap has a plurality of filters and an air distributor. The air distributor has an inner tube and an outer tube. Each of the inner and outer tubes have a plurality of openings to allow exhaust flow to the plurality of filters. One of the inner and outer tubes is rotatable to selectively block exhaust flow to at least one of the plurality of filters at a given time.

19 Claims, 8 Drawing Sheets

PARTICULATE TRAP

TECHNICAL FIELD

The present invention relates generally to a particulate trap, and more particularly to a particulate trap having regeneration capabilities.

BACKGROUND

Engines, including diesel engines, gasoline engines, natural gas engines, and other engines known in the art, may exhaust a complex mixture of air pollutants. The air pollutants may be composed of gaseous and solid material, which include particulate matter. Particulate matter may include unburned carbon particles, which are also called soot.

Due to increased attention on the environment, exhaust emission standards have become more stringent. The amount of particulates emitted from an engine may be regulated depending on the type of engine, size of engine, and/or class of engine. One method that has been implemented by engine manufacturers to comply with the regulation of particulate matter exhausted to the environment has been to remove the particulate matter from the exhaust flow of an engine with a device called a particulate trap. A particulate trap is a filter designed to trap particulate matter and consists of a wire mesh medium. However, the use of the particulate trap for extended periods of time may cause the particulate matter to buildup in the wire mesh, thereby causing the functionality of the filter and engine performance to decrease.

One method of improving the performance of the particulate trap may be to implement regeneration. For example, U.S. Pat. No. 6,572,682 (the '682 patent) issued to Peter et al. on Jun. 3, 2003, describes using a self-cleaning filter system to remove particulate matter from an exhaust flow of an engine. The filter system of the '682 patent is designed for use in a diesel engine and comprises a filter media stack having a plurality of sub-cartridges. Exhaust flow is directed through each of the sub-cartridges via damper valves, to remove particulate matter from the exhaust flow. A heater is used to increase the temperature of the filter and the trapped particulate matter above the combustion temperature of the particulate matter, thereby burning away the collected particulate matter and regenerating the filter system.

Although the filter system of the '682 patent may reduce the particulate matter exhausted to the environment and reduce the buildup of particulate matter in the filter system, the filter system may be complex and costly. In addition, the large size of the filter system of the '682 patent may be incompatible with the limited space within an engine compartment.

The present invention is directed to overcoming one or more of the problems set forth above.

SUMMARY OF THE INVENTION

In one aspect, the present disclosure is directed to a particulate trap that includes a plurality of filters and an air distributor. The air distributor includes an inner tube and an outer tube. Each of the inner and outer tubes have a plurality of openings to allow exhaust flow to the plurality of filters. One of the inner and outer tubes is rotatable to selectively block exhaust flow to at least one of the plurality of filters at a given time.

In another aspect, the present disclosure is directed to a method of removing particulates from an exhaust flow. The method includes selectively directing exhaust flow to at least one filter and filtering particulates out of the exhaust flow with the at least one filter. The method also includes rotating one of an inner tube and an outer tube of an air distributor to selectively block the exhaust flow to the at least one filter. The method further includes selectively applying electrical current to at least one filter section of the at least one filter to cause regeneration of the at least one filter section.

DETAILED DESCRIPTION

Figure 1:
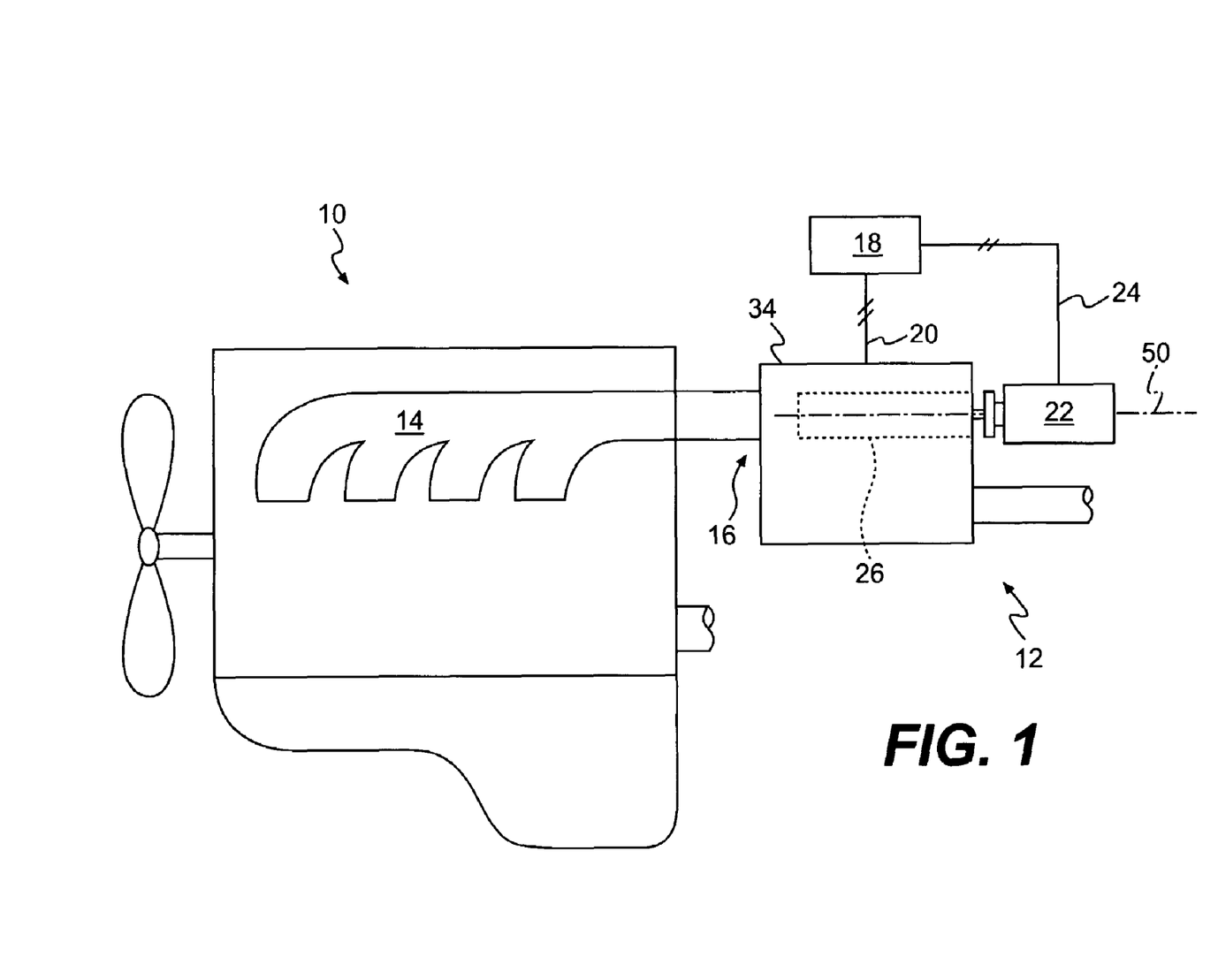
FIG. 1 is a diagrammatic illustration of an engine having a particulate trap according to an exemplary embodiment of the present disclosure.

FIG. 1 illustrates an engine 10 having an exemplary embodiment of a particulate trap 12. Engine 10 may include an exhaust manifold 14 connecting an exhaust flow of engine 10 with an inlet 16 of particulate trap 12. A controller 18 may be in communication with particulate trap 12 via a communication line 20, and with a motor 22 via a communication line 24.

Figure 2:
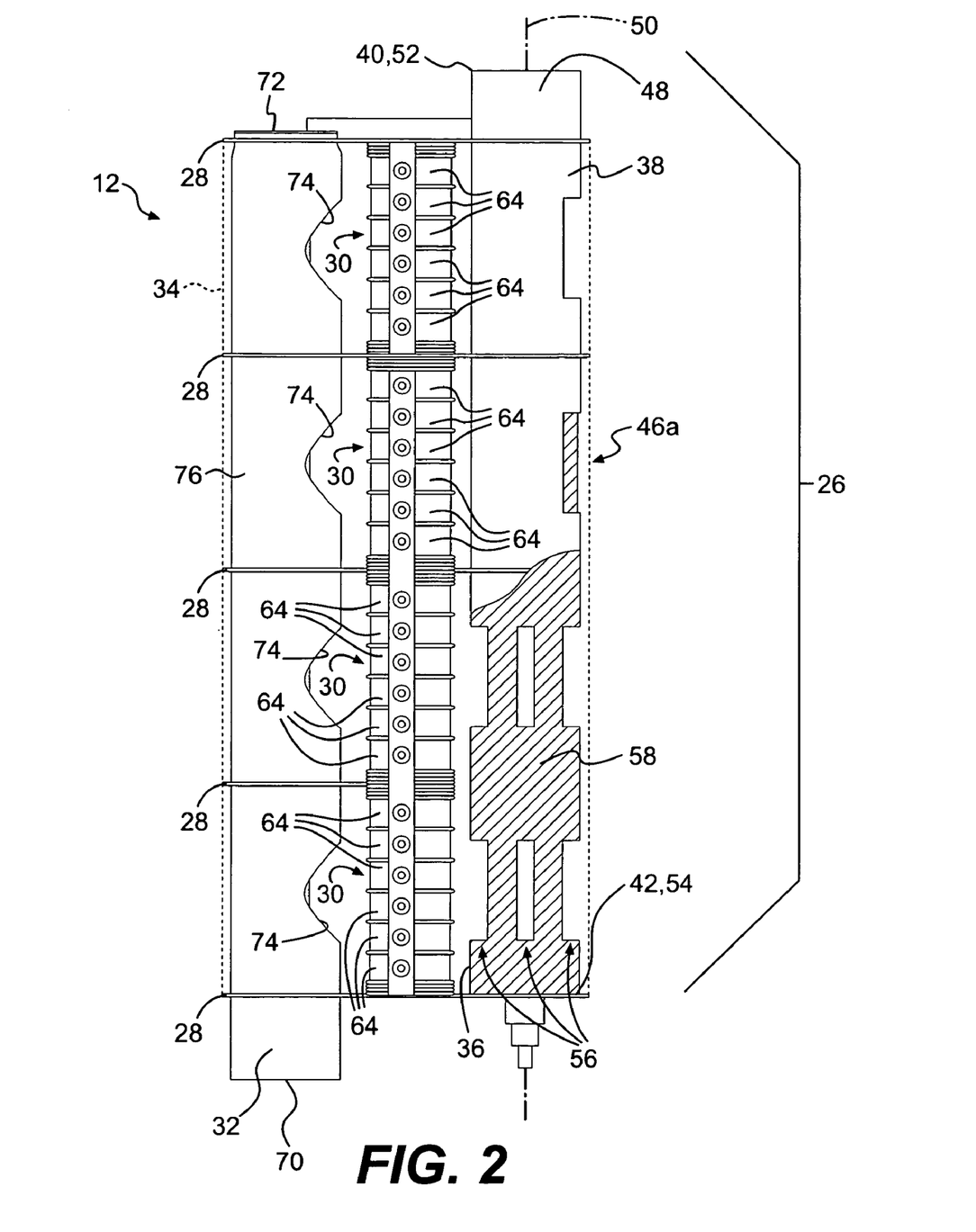
FIG. 2 is a front view diagrammatic illustration of a particulate trap according to an exemplary embodiment of the present disclosure.
Figure 5:
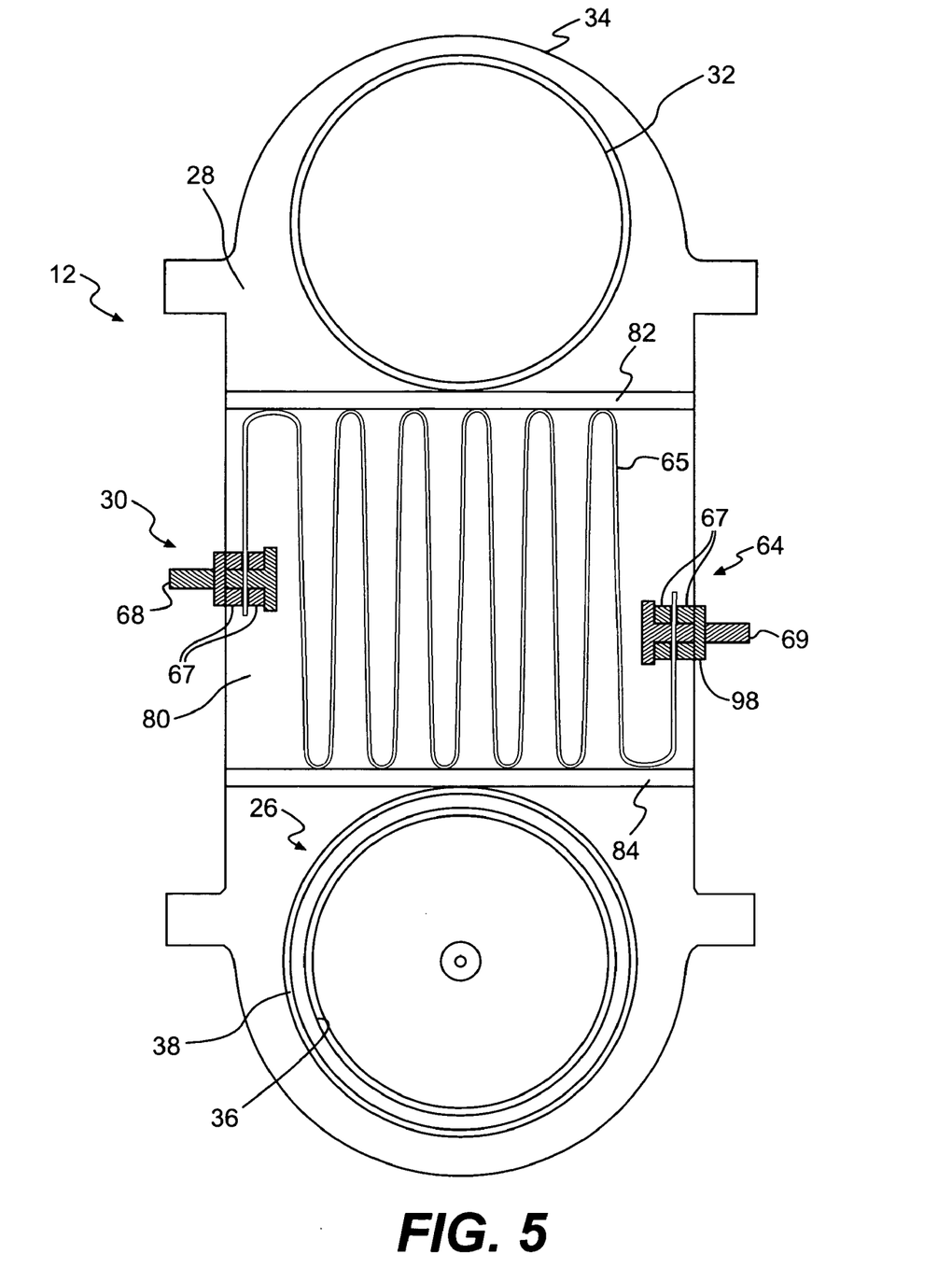
FIG. 5 is a cross-sectioned top diagrammatic view of a particulate trap according to an exemplary embodiment of the present disclosure.

As illustrated in FIGS. 2 and 5, particulate trap 12 may include an air distributor 26, an flow tube 32, one or more insulating dividers 28, one or more filters 30, and a filter housing 34.

Referring to FIG. 2, air distributor 26 may include an inner tube 36 and an outer tube 38. Outer tube 38 may include an open end 40, a closed end 42, and a single column of openings 46 through an outer cylindrical surface 48. In certain embodiments, the openings may have a generally rectangular shape. The single column of openings 46 may be parallel with an axis 50 of outer tube 38. Openings 46 may be oriented away from filters 30 relative to axis 50 to facilitate even distribution of the exhaust flow across filters 30. Inner tube 36 may be rotatably disposed within outer tube 38 and may also have an open end 52 and a closed end 54. Inner tube 36 may be configured to rotate while outer tube 38 remains stationary. Alternately, inner tube 36 may remain stationary while outer tube 38 rotates.

Figure 4:
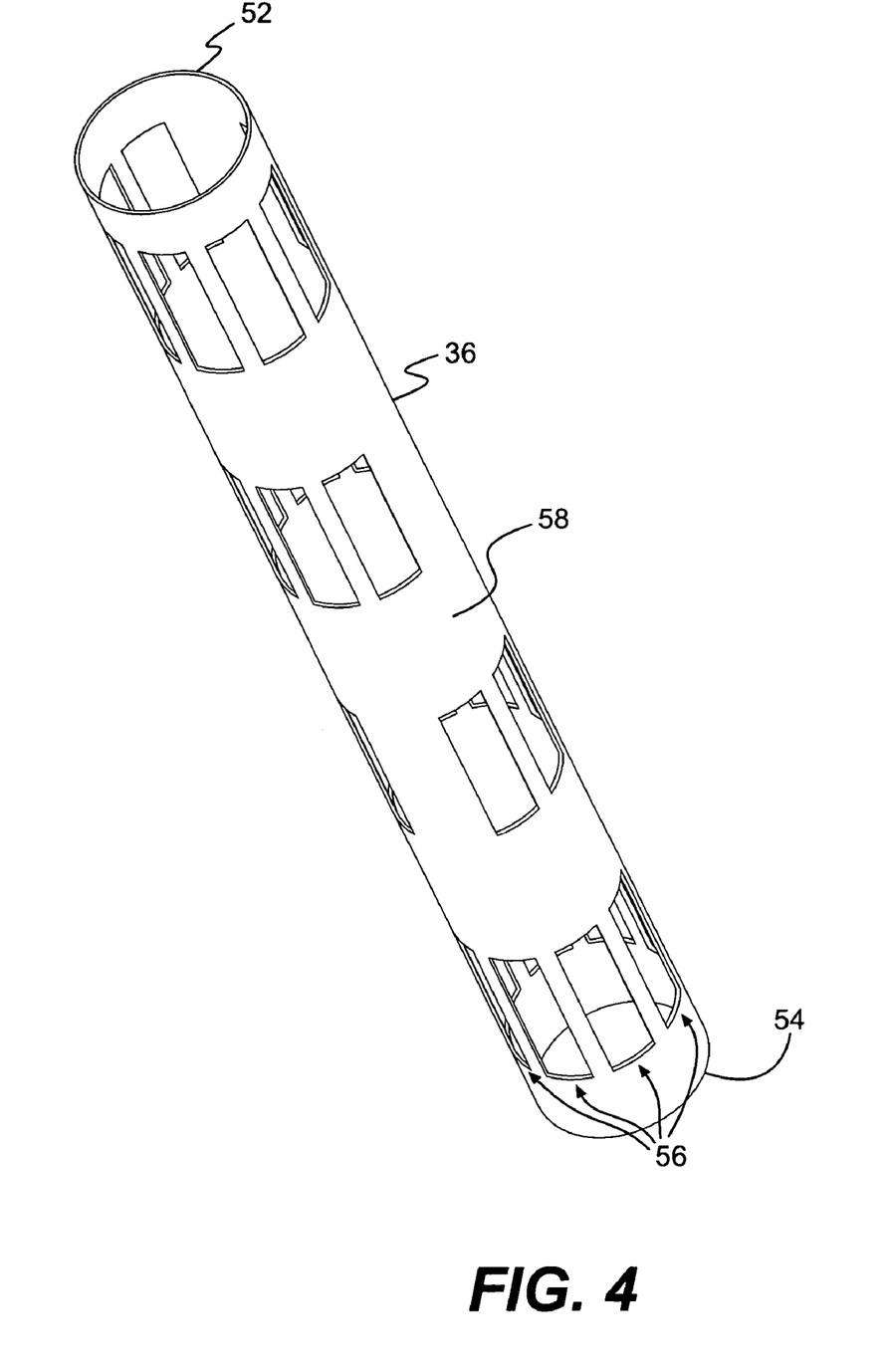
FIG. 4 is a perspective illustration of an inner tube of a particulate trap according to an exemplary embodiment of the present disclosure.

Inner tube 36 may have multiple columns of openings 56 through an outer cylindrical surface 58. In certain embodiments, the openings may have a generally rectangular shape. Each column of openings 56 may also be parallel with axis 50. As best illustrated in FIG. 4, each column of openings 56 may include at least one opening fewer than the number of openings 46 in the single column of openings of outer tube 38, such that when any one column of openings 56 is aligned with openings 46, at least one of openings 46 is blocked. For example, opening 46a is blocked in FIG. 2. The position of the blocked opening may be vertically different relative to axis 50 for each column of openings 56, such that as the inner tube 36 rotates one complete rotation, each of openings 46 is blocked at least once.

Flow tube 32 may also include openings similar to inner and outer tubes 36 and 38. For example, flow tube 32 may include an open end 70, a closed end 72, and a single column of openings 74 through an outer cylindrical surface 76. The number of openings 74 may be equal to the number of openings 46.

One or more insulating dividers 28 may separate one filter 30 from another filter 30 to create filter divisions within particulate trap 12. Each division 30 may be in fluid communication with one or more of openings 46 and one or more of openings 74. Each filter 30 may be modular and independently replaceable. In addition, each filter 30 may include one or more filter sections 64.

Figure 3:
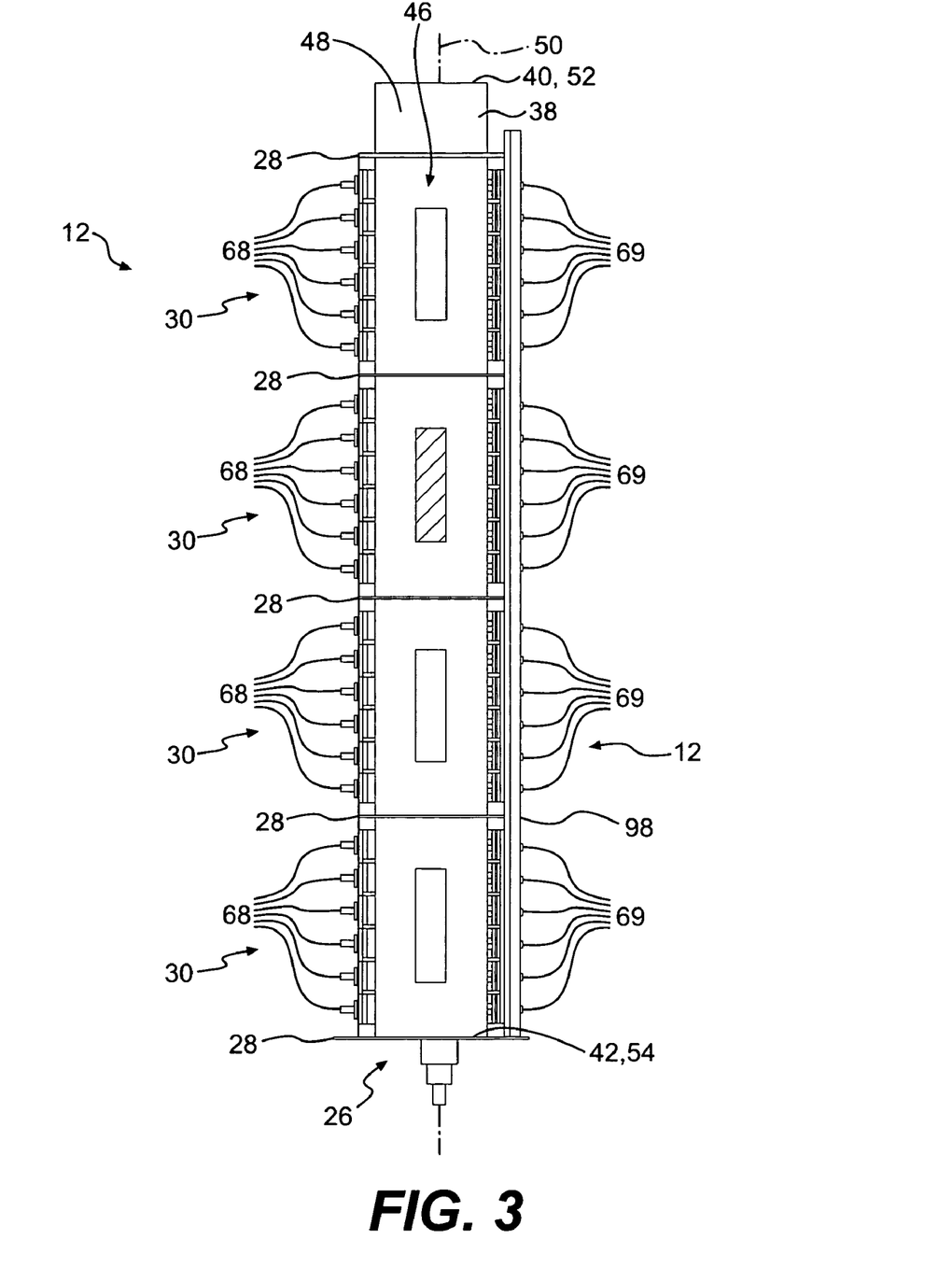
FIG. 3 is a side view diagrammatic illustration of a particulate trap according to an exemplary embodiment of the present disclosure.
Figure 6:
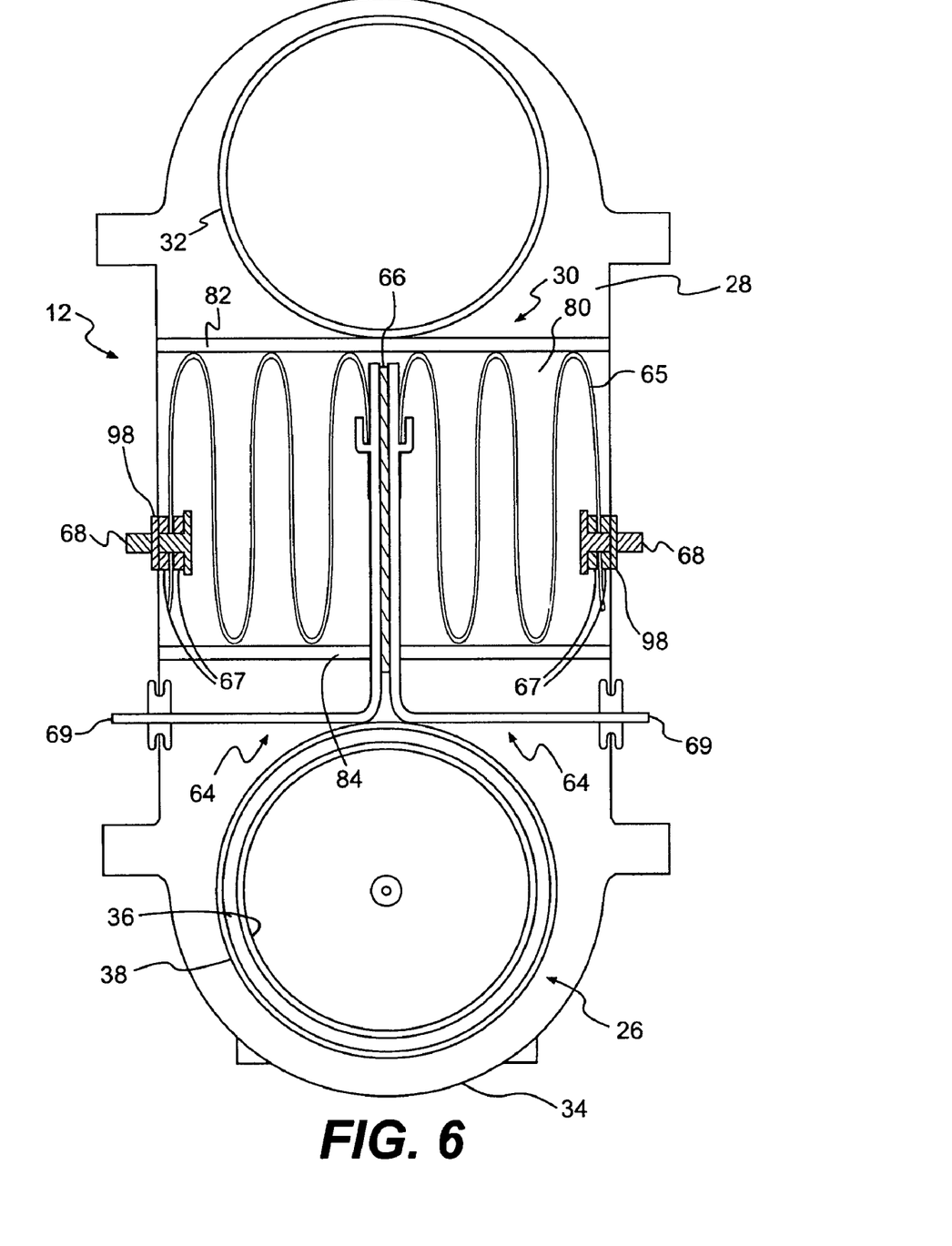
FIG. 6 is a cross-sectioned top diagrammatic view of a particulate trap according to an another exemplary embodiment of the present disclosure.

As illustrated in the different exemplary embodiments of a particulate trap 12 of FIGS. 5 and 6, each of filter sections 64 may be permanent sub-cartridges of a filter 30 and may include corrugated wire-mesh media 65 that are electrically conductive and separated from each other and from housing 34 by additional insulating members 66 and 67. Alternately, each of filter sections 64 may include a non-conductive ceramic filter media having electrically conductive fibers. Each of filter sections 64 may be stacked in rows, columns, and/or layers. FIGS. 2, 3 and 5 illustrate an embodiment where filter sections 64 are stacked in layers, while FIG. 6 illustrates an embodiment where filter sections 64 are stacked in columns.

Figure 7A:
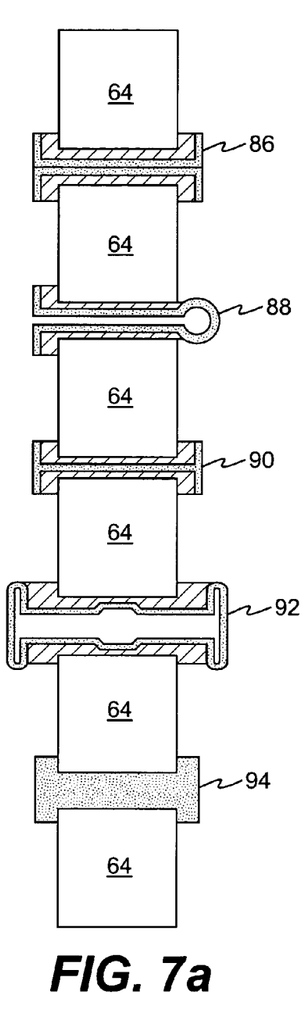
FIG. 7a is a diagrammatic illustration of exemplary alternate embodiments of a component of the present disclosure.

FIG. 7a illustrates a number of exemplary alternative holding members (86, 88, 90, 92, and 94) used for stacking one filter section 64 on another filter section 64, and for insulating one filter section 64 from another filter section 64. Only one type of holding member would typically be used in a particular trap. The holding members may or may not be composed of electrically-conductive material. The holding members composed of electrically-conductive material may be coated with alumina or other suitable coating to provide electrical insulation between the wire mesh media 65 of filter sections 64. Each of the holding members may include a base portion 80, a first side portion 82, and a second side portion 84. The base portion 80 may separate one wire mesh media 65 from another wire mesh media 65, while the first and second side portions 82 and 84 may be used to laterally position one filter section 64 relative to another filter section 64.

A first holding member 86 may be composed of two U-shaped metal sections welded together to form a member having a substantially I-shaped cross-section. The two U-shaped members may be arranged such that two openings oppose each other and can each hold a respective filter section 64. A second holding member 88 may be composed of a single folded metal piece. The single folded metal piece may include identical first and second sides connected via a main fold. Each of the first and second sides may include an end portion bent to engage a side of respective filter sections 64, while the main fold is configured to engage the opposite sides of both joined filter sections 64. A third holding member 90 may be composed of an extruded metal member having a substantial I-shape. Each end of the I-shape may be configured to engage opposing sides of two filter sections 64. A fourth holding member 92 may be composed of a cast member that is also substantially I-shaped, with at least one bump configured to engage a corrugated portion of the respective filter sections 64 for positioning purposes. A fifth holding member 94 may be composed of a non-metallic piece that also includes a substantially I-shaped cross-section. The holding member may also be a flat plate (not shown).

Figure 7B:
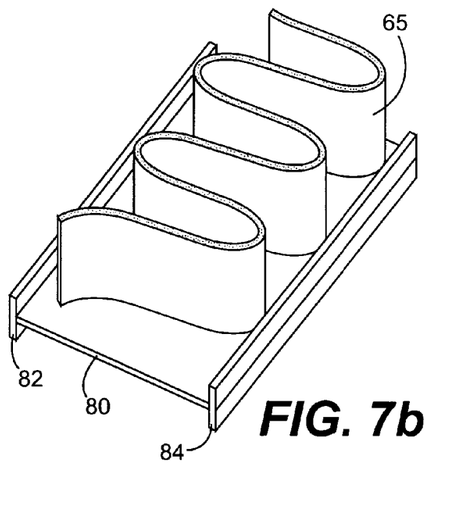
FIG. 7b is a perspective illustration of a filter for use in a particulate trap according to an exemplary embodiment of the present disclosure.
Figure 7C:
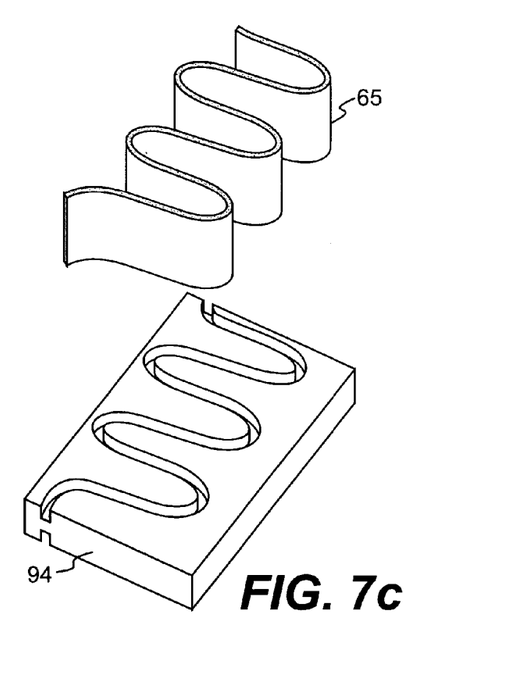
FIG. 7c is a perspective illustration of a filter for use in a particulate trap according to another exemplary embodiment of the present disclosure.

Each of the holding members may have a smooth planar surface for receiving the corrugated wire mesh media 65, as illustrated in FIG. 7b. Alternately, the fifth holding member 94 may include a surface having a serpentine impression configured to match the corrugated shape of wire mesh media 65 as illustrated in FIG. 7c.

Figure 8:
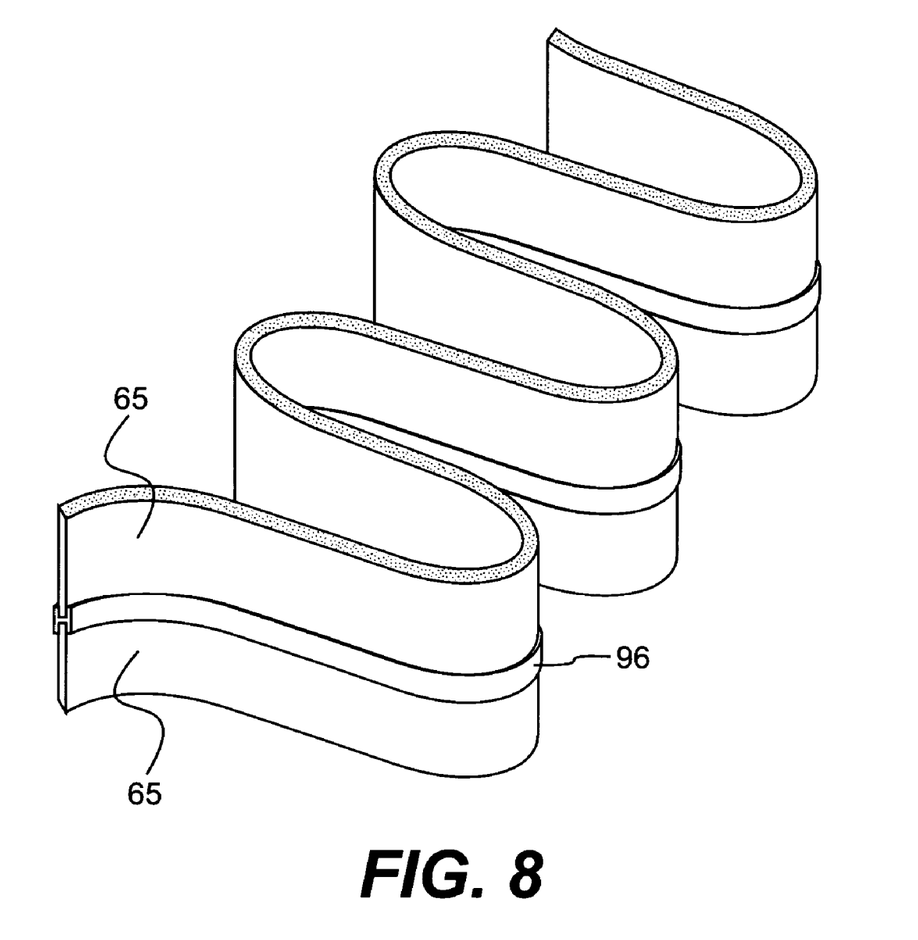
FIG. 8 is a perspective illustration of a filter for use in a particulate trap according to another exemplary embodiment of the present disclosure.

FIG. 8 illustrates a sixth holding member 96 composed of a serpentine shape having a constant, substantially I-shaped cross-section. The sixth holding member 96 may include side members configured to be fitted, sealed, or crimped to two filter sections 64.

Electrical connectors 68 and 69 (referring to FIGS. 3, 5, and 6) may connect one or more filter sections 64 to a power source (not shown) to form an electrical circuit. Electrical connectors 69 may be connected to each other via a common bus bar 98.

Controller 18 (FIG. 1) may include all the components to operate particulate trap 12 such as, for example, a memory, a secondary storage device, and a processor. Various circuits may be associated with controller 18 such as, for example, power supply circuitry, signal conditioning circuitry, solenoid driver circuitry, and other appropriate circuitry.

Motor 22 (FIG. 1) may be connected to inner tube 36 to cause inner tube 36 to rotate. Inner tube 36 may be continuously rotated or rotated in a step-wise manner. Motor 22 may be electrically driven, mechanically driven, hydraulically driven, or driven in any other manner known in the art. Motor 22 may be directly connected to inner tube 36 or may be connected to inner tube 36 via a ratcheting device, a gear mechanism, or in any other appropriate manner known in the art.

INDUSTRIAL APPLICABILITY

The disclosed particulate trap may be applicable to any combustion-type device such as, for example, an engine, a furnace, or any other device known in the art where the removal of particulate matter from an exhaust flow is desired. Particulate trap 12 may allow for a less complex, cheaper, and more compact alternative for reducing the amount of particulate matter exhausted to the environment. In addition, because the disclosed particulate trap 12 does not require a centralized valve assembly, the particulate trap may have increased design flexibility. In particular, the external shape and configuration of the disclosed particulate trap 12 is not limited to a central structure and may, therefore, be modified to accommodate a variety of packaging environments. The operation of particulate trap 12 will now be explained in detail.

According to an exemplary embodiment of particulate trap 12, exhaust flow may be directed into particulate trap 12 through air distributor 26, as illustrated in FIG. 2. The exhaust flow may be directed through holes 56 of inner tube 36, through openings 46 of outer tube 38, through filters 30, and out of particulate trap 12 via flow tube 32. It is also contemplated that the flow of the particulate trap 12 may be reversed, with the flow entering through flow tube 32, flowing through filters 30 and exiting out through inner and outer tubes 36 and 36.

As exhaust flows through the filters 30, particulate matter may be removed from the exhaust flow by the wire mesh media 65 of filter sections 64. Over time, the particulate matter may build up in the wire mesh media 65 of the filter sections 64. If left unchecked, the particulate matter buildup could be significant enough to restrict, or even block the flow of exhaust through openings of the wire mesh media 65, allowing for pressure within the exhaust system of engine 10 to increase. An increase in the back-pressure of engine 10 could reduce the engine's ability to draw in fresh air, resulting in decreased performance of engine 10, increased exhaust temperatures, and poor fuel consumption.

To prevent the undesired buildup of particulate matter within particulate trap 12, individual filter sections 64 within a particular filter 30 may be independently regenerated. Regeneration may be periodic or based on a triggering condition. The triggering condition may be a lapsed time of engine operation, a pressure differential measured across particulate trap 12, or any other condition known in the art.

Controller 18 may be configured to cause regeneration of the filter sections 64. When controller 18 determines that regeneration is required (e.g., when a lapse of time corresponding to engine operation is greater than a predetermined value, or when a pressure measured across particulate trap 12 is greater than a predetermined value), controller 18 may cause inner tube 36 to rotate with respect to outer tube 38. As inner tube 36 rotates within outer tube 38, a series of openings 56 will align with the single column of openings 46 to allow exhaust to flow through at least one of the filter divisions. However, at least one of openings 46 may be blocked by inner tube 36 to prevent exhaust from flowing through at least one filter division. In the case of reversed exhaust flow, inner and outer tubes 36 and 38 may rotate to allow exhaust to flow out of at least one filter division and to block the flow of exhaust out of at least one filter division.

When the exhaust flow is blocked from one of the filter divisions, controller 18 may connect the power source via electrical connectors 68 and 69 to at least one filter section 64 of the blocked filter division. Current from the power source (not shown) may cause filter section 64 to heat up above the combustion temperature of the particulate matter trapped in filter section 64, thereby burning away the buildup of particulate matter.

Blocking the exhaust flow from regenerating filter section 64 may reduce the energy required for regeneration, because the exhaust flow may remove heat during the regeneration process. Because each filter section 64 within each filter division may be separately regenerated, the magnitude of power required at any one time for regeneration may be low. The low power required for regeneration may allow for low cost, power-generating and power circuit components. In addition, because each filter division undergoing regeneration is substantially fluidly isolated from the other filter divisions within the same particulate trap, the exhaust flowing through non-regenerating filter divisions does not affect the amount of energy required to regenerate the fluidly isolated filter division.

The modular design, involving independently replaceable filters 30, may allow for design flexibility as well as low cost maintenance of particulate trap 12. In particular, because the filters 30 are modular, particulate trap 12 may be easily modified to meet the different restriction and filtering requirements of various power systems. In addition, because the filters are independently replaceable, blocked, damaged, or otherwise unusable filters 30 may be easily and independently replaced at a lower cost than would be required to replace the entire particulate trap 12.

It will be apparent to those skilled in the art that various modifications and variations can be made to the disclosed particulate trap without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

what is claimed is:

1. A filter, comprising:
   a plurality of filter elements, each of the plurality of filter elements being electrically conductive;
   a holding member insulating each of the plurality of filter elements from adjacent filter elements and positioning each of the filter elements relative to the adjacent filter element; and
   at least one electrical connector on each end of each of the plurality of filter elements, wherein the plurality of filter elements are electrically connected to each other on at least one end by a bus bar.

2. The filter of claim 1, wherein the holding member includes two substantially u-shaped metal sections welded together.

3. The filter of claim 1, wherein the holding member includes a single folded metal portion.

4. The filter of claim 1, wherein the holding member includes an extruded metal shape.

5. The filter of claim 1, wherein the holding member is cast metal and includes at least one positioning bump.

6. The filter of claim 1, wherein the holding member is non-metallic.

7. The filter of claim 1, wherein the holding member includes an impression matching a shape of the plurality of filter elements.

8. The filter of claim 1, wherein each of the plurality of filter elements includes a wire mesh.

9. The filter of claim 8, wherein the wire mesh is corrugated.

10. The filter of claim 1, wherein the holding member includes a base portion and two side portions, the two side portions being configured to block lateral movement of each of the plurality of filter elements.

11. The filter of claim 1, wherein the holding member is substantially rectangular and has a substantially constant cross-section.

12. The filter of claim 1, wherein the holding member is coated with a non-conductive material.

13. A filter, comprising:
    a plurality of wire mesh elements, each of the plurality of wire mesh elements being electrically conductive;
    at least one electrical connector on at least one end of each of the plurality of wire mesh elements; and
    a holding member insulating each of the plurality of wire mesh elements from adjacent wire mesh elements and positioning each of the wire mesh elements relative to the adjacent wire mesh elements, wherein the holding member includes a base portion and two side portions, the two side portions being configured to block lateral movement of each of the plurality of wire mesh elements.

14. The filter of claim 13, wherein the side portions are sealed to the plurality of wire mesh elements.

15. The filter of claim 13, wherein the side portions are crimped to the plurality of wire elements.

16. The filter of claim 13, wherein the holding member is corrugated and has a substantially constant cross-section.

17. The filter of claim 13, further including at least one electrical connector on each end of each of the plurality of wire mesh elements, wherein the plurality of wire mesh elements are electrically connected on the at least one end.

18. The filter of claim 13, wherein the holding member is coated with a non-conductive material.

19. A filter, comprising:
a plurality of wire mesh elements, each of the plurality of wire mesh elements being electrically conductive; and
a holding member insulating each of the plurality of wire mesh elements from adjacent wire mesh elements and positioning each of the wire mesh elements relative to the adjacent wire mesh elements, wherein the holding member includes a base portion and two side portions crimped to the plurality of wire elements, the two side portions being configured to block lateral movement of each of the plurality of wire mesh elements.

* * * * *

UNITED STATES PATENT AND TRADEMARK OFFICE
CERTIFICATE OF CORRECTION

PATENT NO. : 7,169,200 B2
APPLICATION NO. : 10/743810
DATED : August 10, 2007
INVENTOR(S) : Kolstad et al.

It is certified that error appears in the above-identified patent and that said Letters Patent is hereby corrected as shown below:

In Column 7, Line 9, in Claim 15, after "wire" insert --mesh--

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,169,200 B2  Page 1 of 1
APPLICATION NO. : 10/743810
DATED : January 30, 2007
INVENTOR(S) : Kolstad et al.

It is certified that error appears in the above-identified patent and that said Letters Patent is hereby corrected as shown below:

In Column 7, Line 9, in Claim 15, after "wire" insert --mesh--

This certificate supersedes the Certificate of Correction issued May 6, 2008.

Signed and Sealed this

Third Day of June, 2008

JON W. DUDAS
*Director of the United States Patent and Trademark Office*